(12) United States Patent
Berger et al.

(10) Patent No.: US 10,628,436 B2
(45) Date of Patent: Apr. 21, 2020

(54) DATA ANALYSIS REPORTING TOOL

(71) Applicant: CVS Pharmacy, Inc., Woonsocket, RI (US)

(72) Inventors: Karin Berger, Rio Rancho, NM (US); James Chalker, Phoenix, AZ (US); Wayne Paul Comer, II, Scottsdale, AZ (US); Robert Darin, Sherborn, MA (US); Sheri Faust, Scottsdale, AZ (US); Kim Fordiani, Phoenix, AZ (US); Stacey Goodall, Phoenix, AZ (US); Mir Mujtaba Ali, Phoenix, AZ (US)

(73) Assignee: CVS Pharmacy, Inc., Woonsocket, RI (US)

( * ) Notice: Subject to any disclaimer, the term of this patent is extended or adjusted under 35 U.S.C. 154(b) by 530 days.

(21) Appl. No.: 15/423,514

(22) Filed: Feb. 2, 2017

(65) Prior Publication Data

US 2018/0218051 A1 Aug. 2, 2018

(51) Int. Cl.
*G06F 16/248* (2019.01)
*G06F 16/951* (2019.01)
*G06F 16/2455* (2019.01)
*G06F 16/242* (2019.01)

(52) U.S. Cl.
CPC .......... *G06F 16/248* (2019.01); *G06F 16/242* (2019.01); *G06F 16/2455* (2019.01); *G06F 16/951* (2019.01)

(58) Field of Classification Search
None
See application file for complete search history.

(56) References Cited

U.S. PATENT DOCUMENTS

| | | |
|---|---|---|
| D430,168 S | 8/2000 | Faris et al. |
| 6,232,971 B1 | 5/2001 | Haynes |
| D509,509 S | 9/2005 | Totten et al. |
| D619,593 S | 7/2010 | Fujioka et al. |
| D622,281 S | 8/2010 | Maitlen et al. |
| D622,730 S | 8/2010 | Krum et al. |
| D664,982 S | 8/2012 | Rai et al. |
| D667,417 S | 9/2012 | Long et al. |
| D673,577 S | 1/2013 | Cojuangco et al. |
| D678,302 S | 3/2013 | Trumble et al. |
| D684,160 S | 6/2013 | Truelove et al. |

(Continued)

OTHER PUBLICATIONS

International Search Report and Written Opinion for international application No. PCT/US2018/016716, dated Apr. 3, 2018, 12 pgs.

*Primary Examiner* — Amresh Singh
(74) *Attorney, Agent, or Firm* — Patent Law Works LLP

(57) ABSTRACT

The technology described herein improves presentation of data housed in large data stores (e.g., an enterprise data warehouse) by providing digital reporting tools (e.g., specific computer systems and software) to easily present analysis data to users. Further, the technology described herein allows for data analysis dashboards to provide dynamic manipulation of the underlying data without requiring significant computing resources and a connection to the data stores. Additionally, the technology described herein generates a portable dataset that contains only the relevant data to the request provided by a user, thus alleviating the concern for inadvertently exposing sensitive data.

11 Claims, 17 Drawing Sheets

(56) References Cited

U.S. PATENT DOCUMENTS

| | | |
|---|---|---|
| D685,814 S | 7/2013 | Bork et al. |
| D689,885 S | 9/2013 | Edwards et al. |
| D691,159 S | 10/2013 | Boush et al. |
| D692,455 S | 10/2013 | Dhanani et al. |
| D694,252 S | 11/2013 | Helm |
| D697,080 S | 1/2014 | Scholz et al. |
| D697,935 S | 1/2014 | Lee et al. |
| D708,193 S | 7/2014 | Agnew et al. |
| D711,420 S | 8/2014 | Agnew |
| D717,331 S | 11/2014 | Lin |
| D719,176 S | 12/2014 | Cohen et al. |
| D719,177 S | 12/2014 | Cohen et al. |
| D719,966 S | 12/2014 | Ebtekar et al. |
| D726,746 S | 4/2015 | Poston et al. |
| D728,578 S | 5/2015 | Kito et al. |
| D728,586 S | 5/2015 | Konno et al. |
| D732,550 S | 6/2015 | Westenberg et al. |
| D732,556 S | 6/2015 | Shunock |
| D733,168 S | 6/2015 | Kopetsky et al. |
| D733,727 S | 7/2015 | Cojuangco et al. |
| D735,732 S | 8/2015 | Nezhad et al. |
| D736,219 S | 8/2015 | Petersen et al. |
| D736,249 S | 8/2015 | Omiya |
| D740,842 S | 10/2015 | Liu et al. |
| D740,847 S | 10/2015 | Yampolskiy et al. |
| D743,412 S | 11/2015 | Danielyan et al. |
| D743,413 S | 11/2015 | Danielyan et al. |
| D743,423 S | 11/2015 | Danielyan et al. |
| D743,424 S | 11/2015 | Danielyan et al. |
| D746,855 S | 1/2016 | Choi |
| D747,329 S | 1/2016 | Lessin et al. |
| D748,661 S | 2/2016 | Addaguduru |
| D749,110 S | 2/2016 | Noack et al. |
| D750,099 S | 2/2016 | Seo et al. |
| D750,660 S | 3/2016 | Caldwell |
| D751,580 S | 3/2016 | Herrera et al. |
| 9,274,686 B2 | 3/2016 | Armitage |
| D753,177 S | 4/2016 | Mierau et al. |
| D755,843 S | 5/2016 | Akana et al. |
| D756,371 S | 5/2016 | Bertnick et al. |
| D756,372 S | 5/2016 | Bertnick et al. |
| D757,070 S | 5/2016 | Dziuba |
| D757,092 S | 5/2016 | Raskin et al. |
| D759,075 S | 6/2016 | Bain |
| D759,076 S | 6/2016 | Bain |
| D761,282 S | 7/2016 | Bain |
| D762,704 S | 8/2016 | Li et al. |
| D763,306 S | 8/2016 | Lee et al. |
| D765,673 S | 9/2016 | Leabman |
| D772,266 S | 11/2016 | Eder |
| D773,478 S | 12/2016 | Wesley et al. |
| D777,749 S | 1/2017 | Belkin et al. |
| D778,928 S | 2/2017 | Bertnick et al. |
| D795,273 S | 8/2017 | Rhodes et al. |
| D798,892 S | 10/2017 | Havaldar et al. |
| D799,522 S | 10/2017 | Eder |
| D800,146 S | 10/2017 | Kim et al. |
| D815,119 S | 4/2018 | Chalker et al. |
| D816,689 S | 5/2018 | Chalker et al. |
| D820,295 S | 6/2018 | Wu et al. |
| D830,402 S | 10/2018 | Javed et al. |
| D833,461 S | 11/2018 | Dieken et al. |
| D836,664 S | 12/2018 | Torrento et al. |
| D837,251 S | 1/2019 | Torrento et al. |
| D839,276 S | 1/2019 | Majumdar et al. |
| D840,420 S | 2/2019 | Chalker et al. |
| D840,421 S | 2/2019 | Chalker et al. |
| D840,422 S | 2/2019 | Tuthill et al. |
| D848,468 S | 5/2019 | Ng et al. |
| 2009/0260022 A1 | 10/2009 | Louch et al. |
| 2010/0005411 A1 | 1/2010 | Duncker et al. |
| 2011/0214064 A1 | 9/2011 | Schneider et al. |
| 2014/0245171 A1 | 8/2014 | Jaycobs et al. |
| 2015/0006511 A1 | 1/2015 | Yagoub et al. |
| 2015/0015504 A1 | 1/2015 | Lee et al. |
| 2015/0213211 A1 | 7/2015 | Zaleski |
| 2016/0180030 A1* | 6/2016 | Gunawardena ........ G06Q 50/22 705/2 |
| 2018/0218051 A1 | 8/2018 | Berger et al. |

* cited by examiner

DATA ANALYSIS REPORTING TOOL

BACKGROUND

The present disclosure relates to a data analysis reporting tool. In particular, the present disclosure relates to a data analysis reporting tool that delivers interactive content with dynamic visualizations to users.

Conventionally, datasets in an enterprise data warehouse are accessed by users through an integration layer which provides access to the vast amount of data in the enterprise data warehouse, but require significant computer resources and time to effectively retrieve, analyze, extract, transform, and load data for presentation to users. Further, any user with access to the enterprise data warehouse may have access to data that is not relevant to that particular user, or may even be of a sensitive nature that should not be exposed to the user. Additionally, the vast amounts of data in the enterprise data warehouse require network access to the database and integration layer tools to provide presentation of the data dynamically to users.

SUMMARY

The present disclosure relates to a data analysis reporting tool. According to innovative aspects, the subject matter described in this disclosure may be embodied in a computer implemented method including: receiving, by a computing device, a request to generate reporting data for presentation in a dashboard; generating, by the computing device, data queries based on the request; executing, by the computing device, the data queries to create a report dataset; generating, by the computing device, a dashboard presentation file based on the report dataset and the request; and transmitting, by the computing device, the dashboard presentation file to a user for presentation.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

As set forth in detail below, the technology described herein provides an innovative approach to data analysis and reporting that delivers interactive content with dynamic visualizations to users. More specifically, the technology described herein provides a system and method for data analysis and reporting. For example, the technology described herein may receive inputs from a data source and a user to generate interactive content with dynamic visualizations.

The technology described herein improves presentation of data housed in large data stores (e.g., an enterprise data warehouse) by providing digital reporting tools (e.g., specific computer systems and software) to easily present analysis data to users. Further, the technology described herein allows for data analysis dashboards to provide dynamic manipulation of the underlying data without requiring significant computing resources and a connection to the data stores. Additionally, the technology described herein generates a portable dataset that contains only the relevant data to the request provided by a user, thus alleviating the concern for inadvertently exposing sensitive data.

These and other features may provide a substantially faster experience for consumers of data analysis provided by the dashboards, portability of dashboards to provide dynamic data analysis results without a connection to a central data store, enhanced security of data contained in the central data store, etc.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
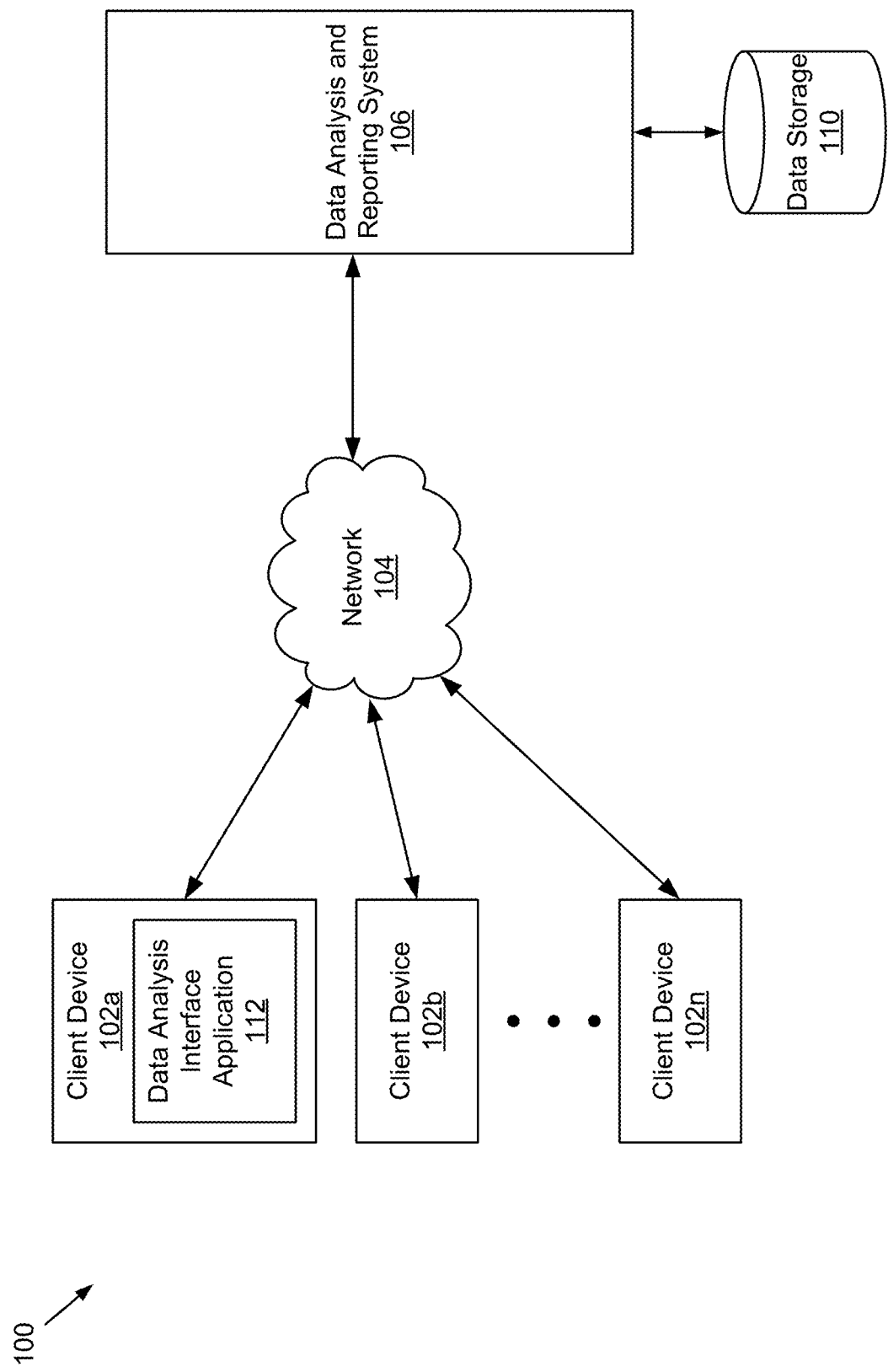
FIG. 1 is a block diagram of an example system for a data analysis reporting tool.

FIG. 1 is a block diagram of an example system 100 for a data analysis reporting tool. The example system 100 may include one or more client devices 102a-102n, a data analysis and reporting system 106 coupled with data storage 110, which may be communicatively coupled electronically via a network 104 for interaction with one another, although other system configurations are possible including other devices, systems, and networks. For example, the system 100 could include any number of client devices 102, data analysis and reporting systems 106, and other systems and devices.

The network 104 may include any number of networks and/or network types. For example, the network 104 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The client device 102 includes one or more computing devices having data processing and communication capabilities. The client device 1002 may be coupled to communicate with other client devices and/or the other entities of the system 100 via the network 104 using a wireless and/or wired connection. Examples of a client device 102 may include, but are not limited to, mobile phones, smartphones, wearable smart devices (e.g., a smartwatch), tablets, laptops, desktops, netbooks, server appliances, servers, virtual machines, TVs, kiosks, etc. The system 100 may include any number of client devices 1002, including client devices of the same or different types.

In some implementations, the client device 102 may include a data analysis interface application 112. A user of the client device 102 may use the input/output devices of the client device 102 to interact with the data analysis interface application 112 installed on the client device 112 or via a browser, etc., for interacting with the data analysis and reporting system 106.

The data analysis interface application 112 may include computer logic executable by a processor on a client device 102 to provide for user interaction, receive user input, present information to the user via a display, and send data to and receive data from the other entities of the system 100, for example, via the network 104. In some implementations, the data analysis interface application 112 may generate and present user interfaces based at least in part on information received from the data analysis and reporting system 106. In some implementations, the data analysis interface application 112 may be an application configured to communicate with the data analysis and reporting system 106. For example, the data analysis interface application 112 may include a web browser and/or code operable therein, a customized client-side application (e.g., a dedicated application), a combination of both, etc. In some implementations, some or all of the components of the data analysis interface application 112 are operable on the data analysis and reporting system, and the client device 102 may access the functionality of the data analysis interface application 112 using a web browser or other application on the client device 102.

The data analysis interface application 112 may also be referred to herein as the Trend Analysis Dashboard. It should be understood that this and other terms should not be construed as limiting and that the functionality of the data analysis interface application 112 may be distributed among one or more components of the system 100.

The data analysis and reporting system 106 may be configured to provide functionality described herein for generating and transmitting a local dataset to the data analysis interface application 112. Example components of the data analysis and reporting system 106 are described herein with reference to FIG. 2. The data analysis and reporting tool may be configured to create a dashboard presentation file specific to an individual request. This dashboard presentation file offers a number of advantages over traditional online interactive dashboards. For example, the data contained in the dashboard presentation file is specific to the client insuring that only their information is visible. Further, all of the data required to interact with the dashboard is contained in a local dataset within the dashboard presentation file and does not require a network connection (e.g., to network 104).

The local dataset is organized with an extremely efficient data structure allowing for even the most complex dashboards to remain responsive. Take, for example, a scenario where a sales analysis is to be presented to user from a primary dataset, contained in a data store available to the data analysis and reporting tool 106, that includes roughly 12,000 rows. If the dashboard were to be developed with conventional data visualization techniques, assuming support for 36 months of history, including all 12,000 possible products (e.g., prescription drugs), and all groups of products with purchase/claim activity (e.g., 3.5 million distinct groups). The billions of rows in the resulting dataset would not only impact the overall performance of the dashboard, but would prevent the user from being able to transport the dashboard into an offline accessible file such as those described herein.

In one embodiment, the data analysis and reporting tool 106 may be used to present prescription drug sales and cost data with dynamic visualizations that allow for a customized discussion around trend management to a client of a retail pharmacy. Various graphical user interfaces and dashboards are described herein that are particular to a historical trend analysis of prescription drug data and trend forecasting of prescription drug data. However, it should be understood that the technology introduced herein can be used to provide visualization and dashboards relating to any set of data, for example, sales analysis, user data analysis, behavioral analysis, etc.

In one embodiment, the data analysis and reporting tool 106 provides a trend analysis dashboards such as a high cost claimant dashboard, which presents data on the costliest members in a client's population, as well as an outlier detection dashboard and an average wholesale price inflation dashboard, which presents modeled data use to dig deeper into trend. The data analysis and reporting tool 106, may also provide dashboards that focus on specific lines of business or people who left/stayed on a prescription drug plan so that the user can see the trend variances within a population. Further, the data analysis and reporting tool 106 may provide class specific dashboards which provide data for a particular class of products (e.g., specialty prescription drugs). For example, a class specific dashboard may profile PCSK9/hyperlipidemia or Hepatitis C specialty drug classes which allows for a deep dive into data and trends pertaining to those particular drug classes. In some embodiments, the dataset provided in the dashboard presentation file includes specialty guideline management data within the trend analysis so the user can clearly see how the class is managed.

It should be understood that the system 100 illustrated in FIG. 1 is representative of an example system and that a variety of different system environments and configurations are contemplated and are within the scope of the present disclosure. For instance, various operations and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
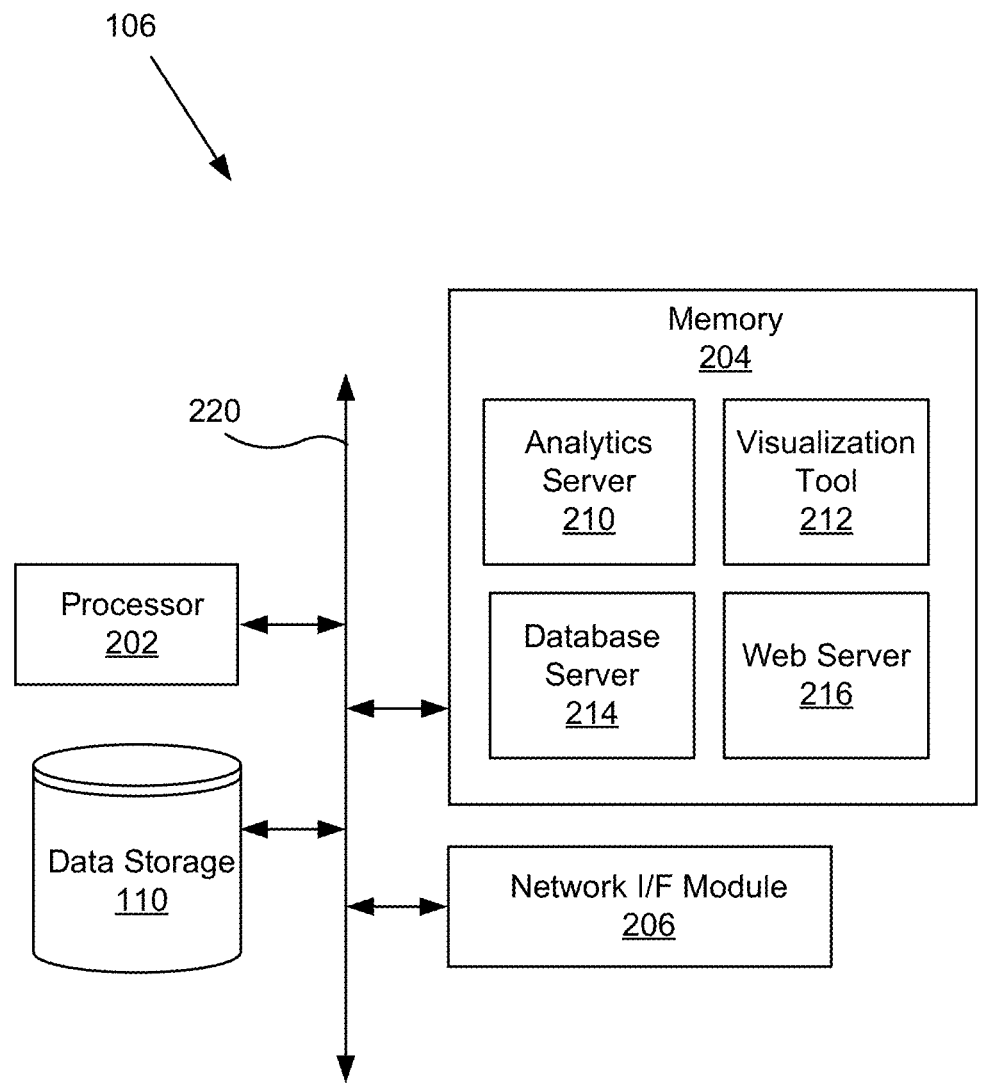
FIG. 2 is a block diagram of an example data analysis and reporting system.

FIG. 2 is a block diagram of an example data analysis and reporting system 106. In the example of FIG. 2, the data analysis and reporting system 106 includes a processor 202, a memory 204, a network interface (I/F) module 206, and data storage 110. The components of the data analysis and reporting system 106 are communicatively coupled to a bus or software communication mechanism 220 for communication with each other.

It is to be understood that the components of the data analysis and reporting system 106 can be instantiated (for example as object code or executable images) within a system memory (e.g., RAM, ROM, flash memory) of a computer system, such that when a processor of the computer system processes a component of the data analysis and reporting system 106, the computer system executes the associated functionality. As used herein, the terms "computer system," "computer," "client," "client computer," "server," "server computer" and "computing device" mean one or more computers configured and/or programmed to execute the described functionality. Additionally, program code to implement the functionalities of the data analysis and reporting system 106 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

It is to be understood that although the data analysis and reporting system 106 is illustrated in FIG. 2 as a single entity, the data analysis and reporting system 106 and/or its components may represent a collection of functionalities, which can be instantiated as a single or multiple systems or modules, as desired.

The processor 202 may include an arithmetic logic unit, a microprocessor, a general-purpose controller or some other processor array to perform computations. In some embodiments, the processor 202 is a hardware processor having one or more processing cores. The processor 202 is coupled to the bus or software communication mechanism 220 for communication with the other components of the data analysis and reporting system 106. Processor 202 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 2, multiple processors and/or processing cores may be included. It should be understood that other processor configurations are possible. As described elsewhere herein, the data analysis and reporting system 106 may be distributed among multiple computing devices each having a configuration similar to that depicted in the example of FIG. 2.

The memory 204 stores instructions and/or data that may be executed by the processor 202. In the illustrated embodiment, the memory 204 includes an analytics server 210, a visualization tool 212, a database server 214, and a web server 216. The memory 204 is coupled to the bus or software communication mechanism 220 for communication with the other components of the data analysis and reporting system 106. The instructions and/or data stored in the memory 204 may include code for performing the techniques described herein. The memory 204 may be, for example, non-transitory memory such as a dynamic random access memory (DRAM) device, a static random access memory (SRAM) device, flash memory, or some other memory device. In some embodiments, the memory 204 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

The network interface module 206 is configured to connect the data analysis and reporting system 106 to a data communication network (e.g., network 104). For example, the network interface module 206 may enable communication through one or more of the internet, cable networks, and wired networks. The network interface module 206 links the processor 202 to the data communication network that may in turn be coupled to other processing systems. The network interface module 206 also provides other conventional connections to the data communication network for distribution and/or retrieval of data objects (e.g., files and/or media objects) using standard network protocols such as Transmission Control Protocol/Internet Protocol (TCP/IP), Hypertext Transfer Protocol (HTTP), Secure Hypertext Transfer Protocol (HTTPS), and Simple Mail Transfer Protocol (SMTP) as will be understood. In some embodiments, the network interface module 206 includes a transceiver for sending and receiving signals using WiFi, Bluetooth®, or cellular communications for wireless communication.

Further, as depicted in the example of FIG. 2, the data analysis and reporting system 106 includes data storage 110. In the illustrated embodiment, the data storage 110 is communicatively coupled to the bus or software communication mechanism 220. In one embodiment, the data storage 110 is a non-transitory memory that stores data for providing the functionality described herein. The data storage 110 may be a dynamic random access memory (DRAM) device, a static random access memory (SRAM) device, flash memory or some other memory devices. In some embodiments, the data storage 110 may also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some embodiments, data storage 110 comprises an enterprise data warehouse or other large data store which may include multiple storage devices centrally located or distributed.

Analytics server 210 may be configured to receive a request to generate reporting data and generate and execute data queries as described in more detail herein. For example, in one embodiment, the analytics server 210 may be an application server providing analytics and data aggregation functions.

Visualization tool 212, in one embodiment, is configured to generate a dashboard presentation file as described herein. For example, in one embodiment, the visualization tool 212 may be configured to translate and package data from the analytics server into the dashboard presentation file that is compatible with data analysis interface application. For example, the visualization tool 212 may generate Tableau data extract files to be included in the dashboard presentation file.

Database server 214 may be configured to provide access to organized data on data storage 110. In one embodiment, database server 214 may be a relational database server. For example, the database server 214 may include Oracle, DB2, Informix, Microsoft SQL, Ingres and/or MySQL servers.

Web server 216 may be configured to provide access to the data analysis and reporting system 106. In one embodiment, web server 216 may provide access to the data analysis interface application 112 via a web browser or the like. Further, the web server 216 may provide access to a dashboard presentation file, e.g., via download, email transmission, etc.

Figure 3:
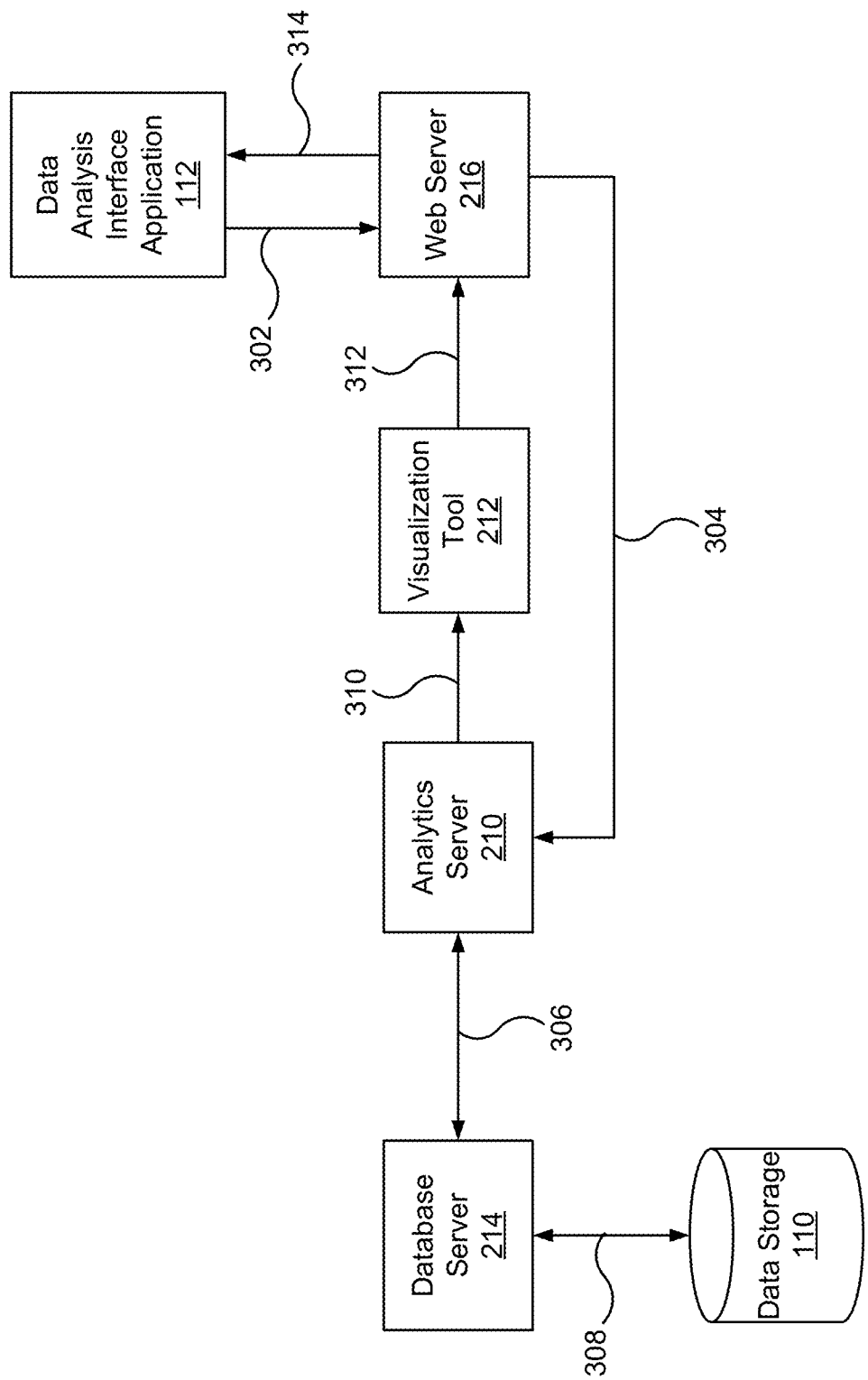
FIG. 3 is a data flow diagram depicting an example data flow for generating an interactive data analysis dashboard.

FIG. 3 is a data flow diagram depicting an example data flow for generating an interactive data analysis dashboard. As depicted in FIG. 3, data analysis interface application 112 may transmit a request 302 to web server 216 to generate a dashboard presentation file. The web server 216 transmits the request to the analytics server 210 to process the data for the dashboard presentation file. The analytics server 210 requests data 306 from database server 214 which retrieves 308 the relevant data from data storage 110. Analytics server 210 may then transmit 310 the relevant data to the visualization tool 212 where the data is packaged into a dashboard presentation file. The web server 216 may then transmit 314 the packaged dashboard presentation file to the data analysis interface application 112 for presentation to the user.

Figure 4:
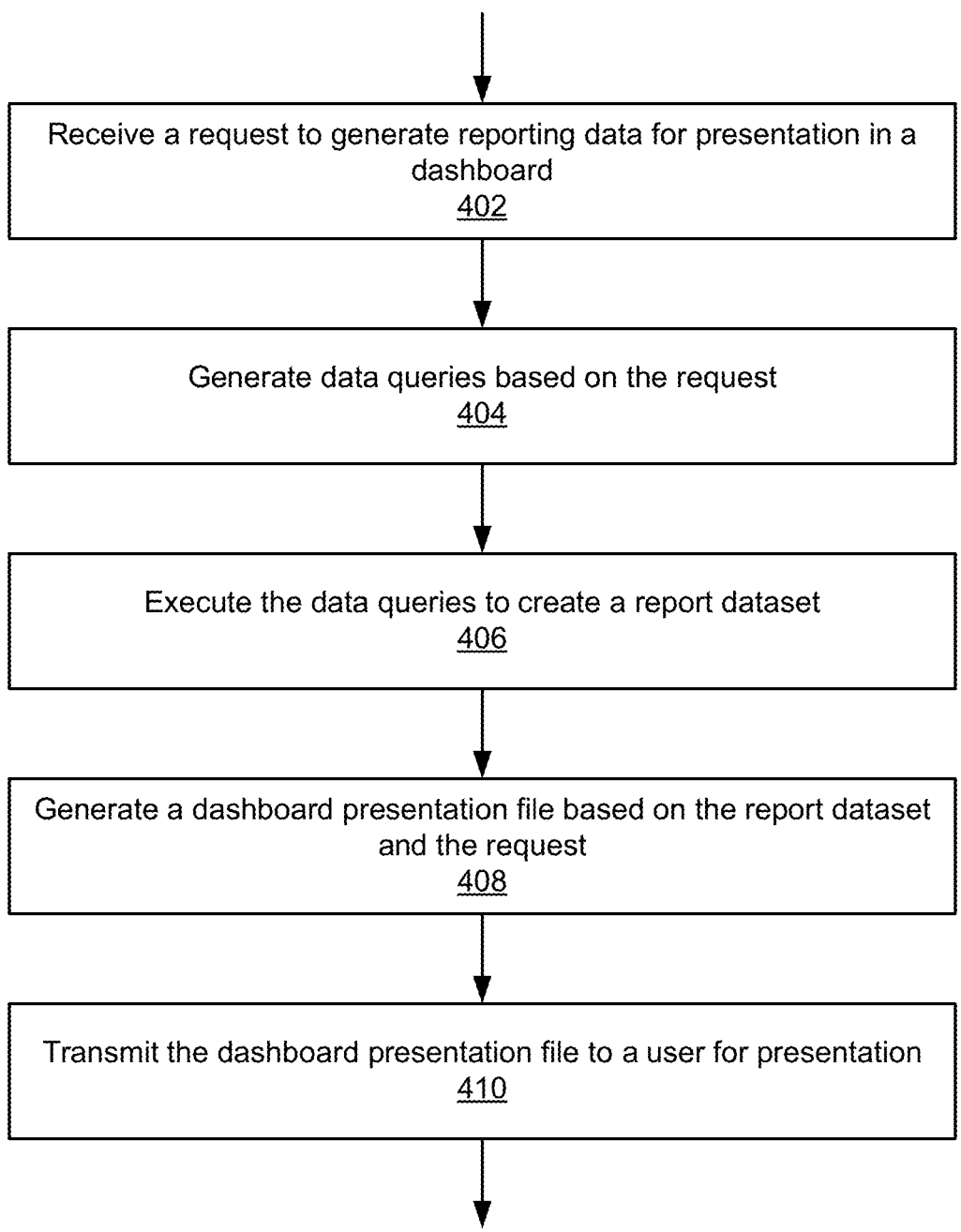
FIG. 4 is a flow diagram of an example method for generating an interactive data analysis dashboard.

FIG. 4 is a flow diagram of an example method for generating an interactive data analysis dashboard. At 402, the web server 216 receives a request to generate reporting data for presentation in a dashboard. For example, the web server 216 may receive a request to generate a dashboard presentation file. In response to receiving the request, the web server 216 may perform basic validation on the request. For example, the web server 216 may enforce restriction on client types supported for a particular set of data so that unauthorized access to restricted data is not granted. Further, web server 216 may enforce a data set size (e.g., a minimum history) to ensure meaningful data for the analysis and any additional custom validation that may be used to determine if the request should be accepted. Additionally, the web server 216 may determine whether sufficient parameters were provided by the user of the data analysis interface application. For example, in one embodiment when generating a trend analysis for prescription drug sales data, the web server 216 may determine whether client information, date ranges, peer comparisons, client overrides, and any additional custom parameters have been collected from the user.

At 404, the analytics server 210 receives the request from the web server and generates data queries based on the request. In one embodiment, the analytics server 210 generates SQL queries as described in more detail with reference to FIG. 5.

At 406, the database server 214 executes the data queries to create one or more report datasets from data retrieved from data storage 110. In one embodiment, the analytics server 210 generates one or more queries based on the request. The analytics server 210 maintains a query history table to store every SQL statement executed for a request in its final state. The query history table also tracks which request the SQL statement was executed for, the query description, the data group the query belonged to, the status of the query, when the query started, when the query completed, and any associated error messages. Because of the information stored in it the query history table, the table can be a valuable resource for issue resolution and performance tuning.

At 408, the visualization tool 212 generates a dashboard presentation file based on the one or more report datasets and the request. For example, in one embodiment, the visualization tool 212 creates a copy of a template layout (e.g., a Tableau workbook) and the associated report datasets (e.g., extract files) and renames the files based on the client data requested, the user making the request, and the date the request was made. Similar to the data collection portion of the process, each request type has a group of associated data selects used to gather the report datasets to populate into the report. In one embodiment, each report dataset is loaded into a Tableau data extract file using the Tableau Data Extract API. A single dashboard presentation file might contain multiple datasets. Datasets can also be mapped to multiple request types allowing generic data to be reused across reports in a consistent manner. In one embodiment, after the data has been populated, the workbook and data extract files are packaged (e.g., zipped) for delivery to the data analysis interface application.

At 410, the web server 216 transmits the dashboard presentation file to the data analysis interface application 112 for presentation to a user. In various embodiments, for example based on the request, the web server 216 may email the dashboard presentation file to the user, make the dashboard presentation file available online, a combination of both, or use other delivery methods. In one embodiment, an email message containing the dashboard presentation file can also be customized to include any associated data requested or desired to be included by the dashboard providers.

Figure 5:
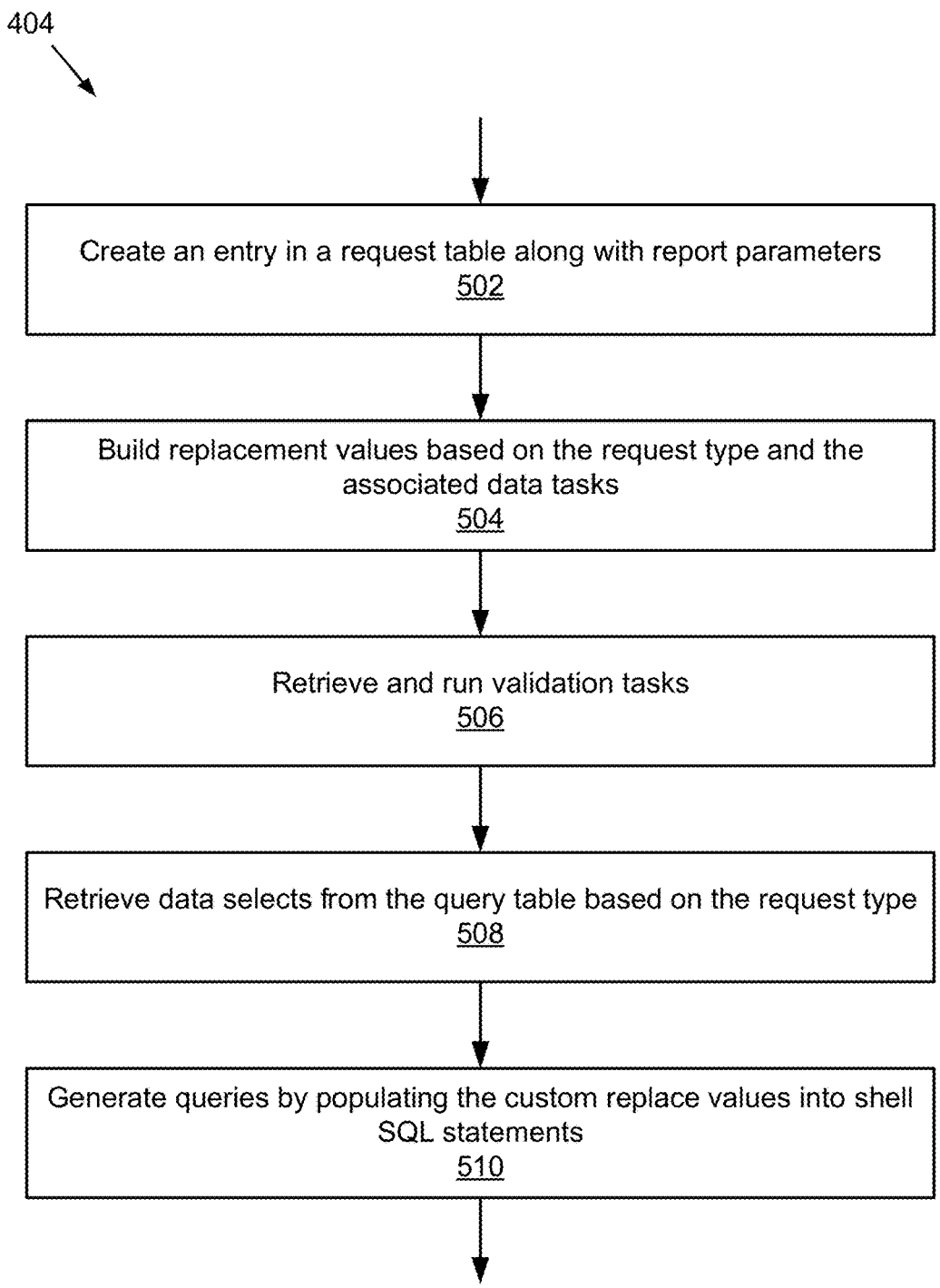
FIG. 5 is a flow diagram of an example method for generating queries based on a data request.

FIG. 5 is a flow diagram of an example method for generating queries 404 based on a data request. The example of FIG. 5 illustrates a method for generating queries for a SQL database. However, it should be understood that similar methods may be used to generate queries for other database formats. At 502, the analytics server 210 creates an entry in a request table along with requested report parameters.

At 504, the analytics server 210, builds replacement values based on the request type and the associated data tasks. In one embodiment, replace values can be associated with a request type or a group of queries. SQL statements may be used to query local tables to build the replace values. In one embodiment, the replace values are derived from local summary tables maintained by the analytics tool 210 or values collected from the request screen presented to a user via data analysis interface application 112.

At 506, the analytics server 210 retrieves and runs validation tasks. In one embodiment, the analytics server 210 retrieves validation tasks from a validation table. Validation statements may be SQL statements that are executed against any of the available data sources and return either a 1 or 0 to signify pass or fail. As described herein, validation is linked to a particular query group. For each request, there may be two levels of failure. A first level, for example, prevents the report from running and a second level warns the user of possible complications associated with the provided data. For example, if the request does not specify a sufficient data range or the dataset did not have sufficient history to produce meaningful results, a second level warning may be triggered. In some embodiments, validation statements may be customized for each request based on the data requested and any supplied date ranges.

At 508, one validation is complete, the analytics server 210 retrieves data selects from the query table based on the request type. In one embodiment, the analytics server orders queries according to the execution order defined by the request type and then by the execution order defined within the query group. For example, the request type may be a trend analysis request for a prescription drug benefit management service client.

Summary tables for models may be maintained in a database on data storage 110 so the request may have the following order defined: (1) build a temporary table containing the requested client definition on the data warehouse on the database; (2) execute the trend analysis task (within the trend analysis task there may be multiple (e.g., four) SQL statements ordered such that temporary data is populated first and then final data selects are performed afterwards); (3) delete temporary table containing the client definition.

In some embodiments, for a particular data select, there may be a single query for multiple data platforms supported by the enterprise data warehouse, combinations of platforms, or a separate query for each. Further, queries can be grouped together into a single data task.

In one embodiment, each query has an associated data source that is used to determine the linked database server to execute the SQL against. The associated data source may further determine how the client where clause is built. Using the combination of the data source and platform provides great flexibility in client definitions. For example, even though CDW and ZEUS databases have very similar structures the same client ID might be concatenated into a single field in one warehouse and contained in multiple fields in the other.

In some embodiments, groups of queries can be associated with multiple request types. This allows the analytics server 210 to maintain a single set of code and be consistent across reports. For example, trend logic developed for a prescription benefit management client can be reused for other clients and any updates to one will be automatically applied to the other.

At 510, the analytics server 210 generates queries by populating the custom replace values into shell SQL statements. For example, each query may be built so that the result set is returned in the exact structure of a destination staging table.

Figure 6:
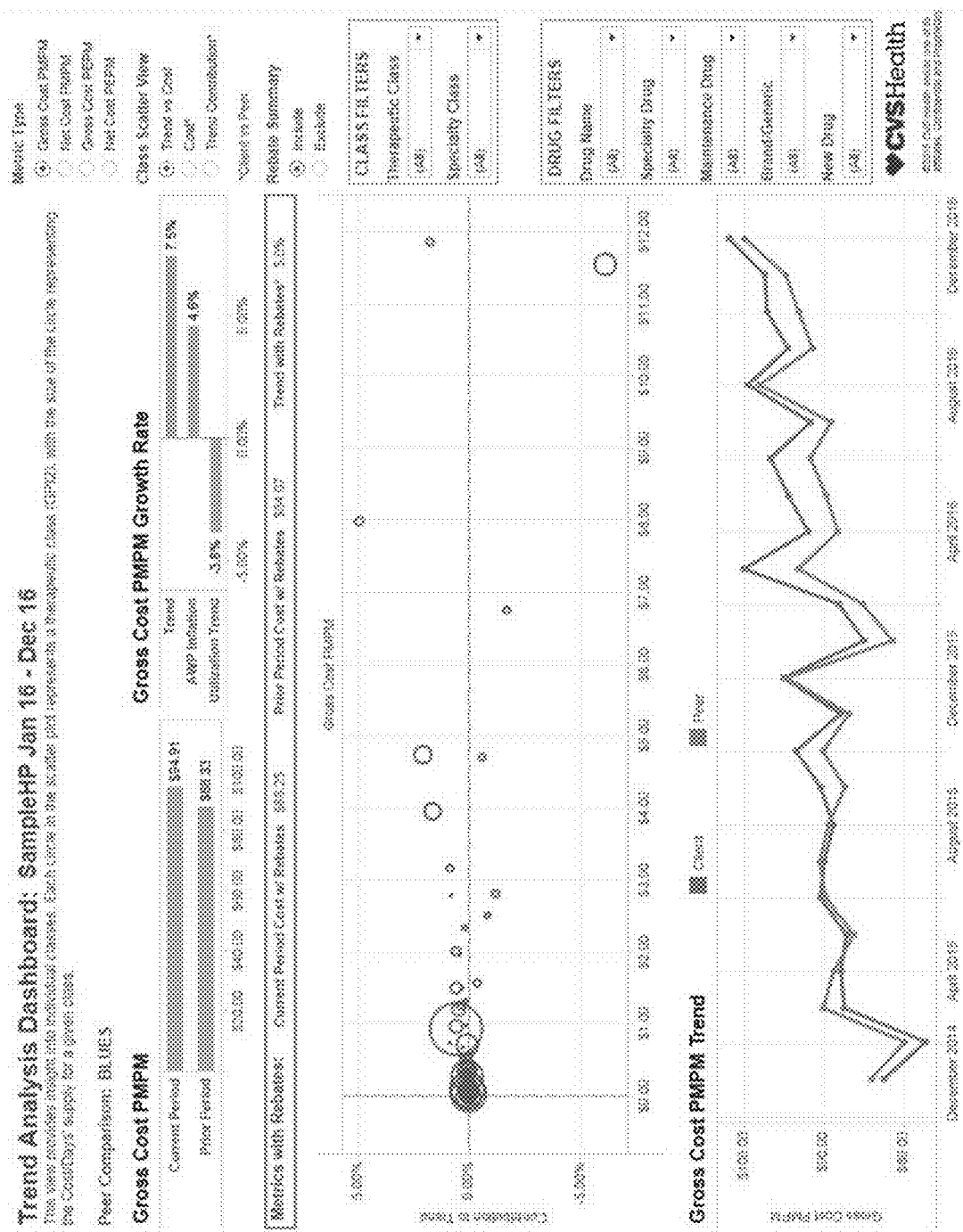
FIG. 6 is an example graphical user interface depicting a trend analysis dashboard generated by the data analysis reporting tool.

FIG. 6 is an example graphical user interface depicting a trend analysis dashboard generated by the data analysis reporting tool. The technology disclosed herein provides for dynamic and interactive dashboards. In the example of FIG. 6, a trend analysis dashboard for prescription drug sales/claims is depicted. The trend analysis dashboard includes data within six tabs—trend waterfall, class, drug, top drug/class, drug and class longitudinal view, and key metrics tab. FIG. 6 depicts an initial view of data that shows a client's overall trend across selected drugs in which the client had utilization during the current period. The initial view provides data for all drugs included in the report. For example, the Gross Cost data reflects all drugs utilized by the client during the current period. For an interactive experience, the user can use the filters on the right side of the graphical user interface to segment data or the user can click on individual circles (each representing a particular drug or class of drugs) within the scatter plot. When a filter is applied, all content on the page will adjust accordingly. This adjustment is reflected in the example of FIG. 7.

Figure 7:
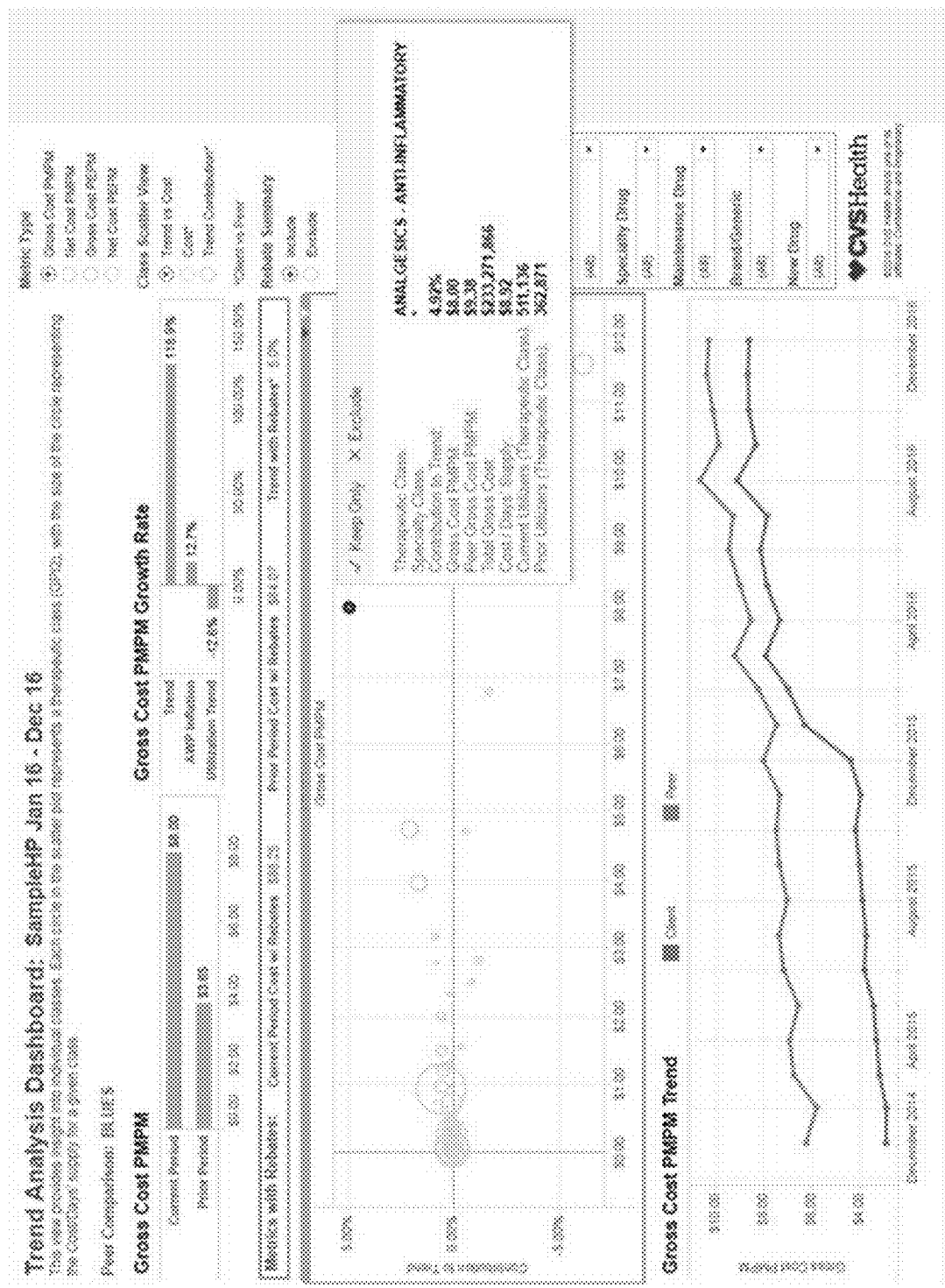
FIG. 7 is an example graphical user interface depicting a trend analysis dashboard generated by the data analysis reporting tool with selection of a particular data point.

FIG. 7 is an example graphical user interface depicting a trend analysis dashboard generated by the data analysis reporting tool with selection of a particular data point. In the example of FIG. 7, a user has clicked on a circle in scatter plot representing a particular class of drugs (e.g., Analgesics-Anti-inflammatory). As can be seen when comparing FIG. 6 and FIG. 7, the charts and graphs are modified in FIG. 7 to reflect only the data associated with the selected class of drugs. In another embodiment, when a user hovers over a particular circle with an interface device (e.g., a mouse), a box appears with additional metrics for the class or drug. In some embodiments, multiple drugs/classes may be selected at once, as depicted in the example of FIG. 8.

Figure 8:
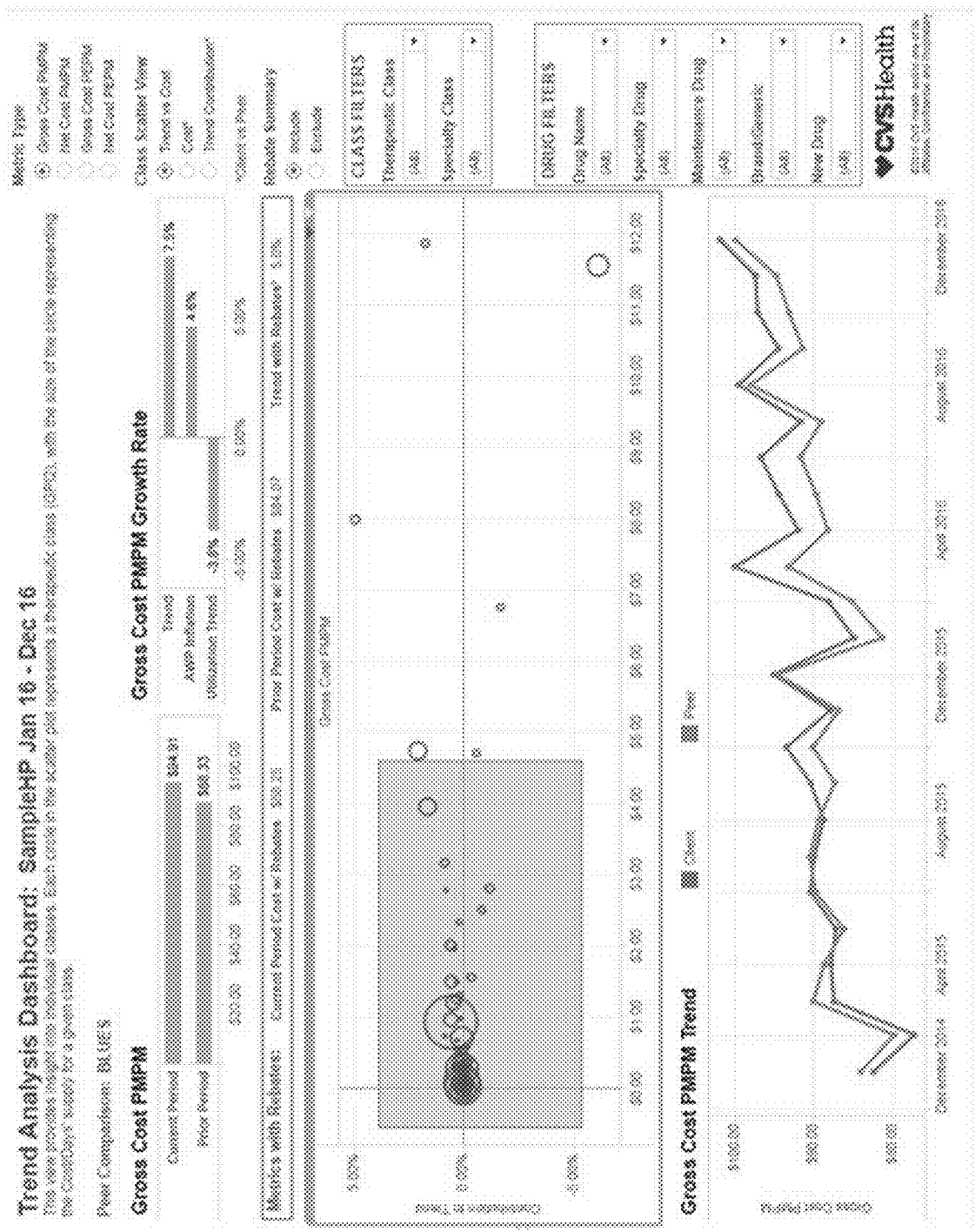
FIG. 8 is an example graphical user interface depicting a trend analysis dashboard generated by the data analysis reporting tool.

FIG. 8 is an example graphical user interface depicting a trend analysis dashboard generated by the data analysis reporting tool. In the example of FIG. 8, the view is of the initial screen where all classes are shown together. A bounding box depicts a selection of drugs/classes of drugs to filter accordingly. When the filter is applied, all content on the page will adjust as reflected in the example of FIG. 9.

Figure 9:
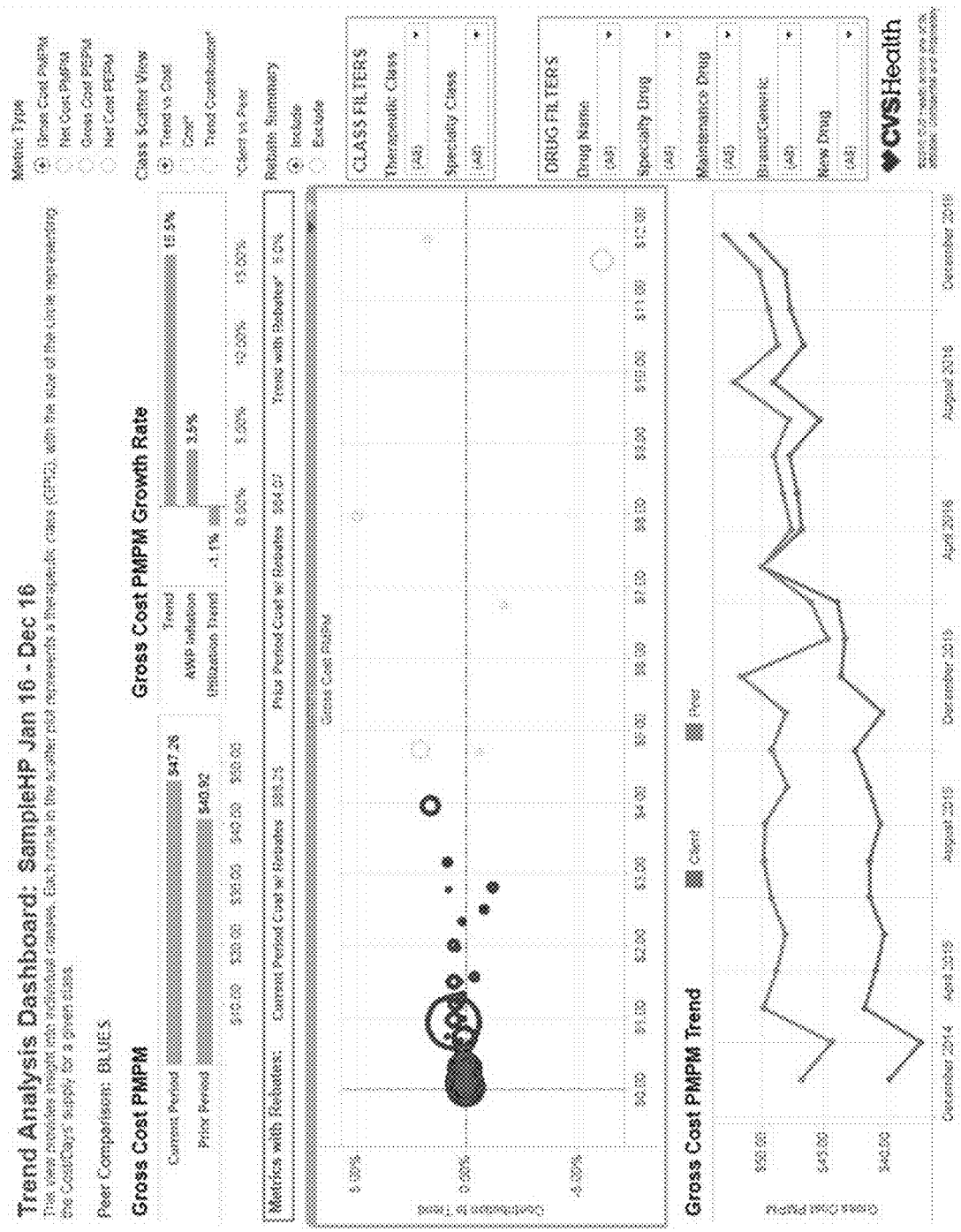
FIG. 9 is an example graphical user interface depicting a trend analysis dashboard generated by the data analysis reporting tool with selection of a group of data points.

FIG. 9 is an example graphical user interface depicting a trend analysis dashboard generated by the data analysis reporting tool with selection of a group of data points. As can be seen when comparing FIG. 8 and FIG. 9, the charts and graphs in FIG. 9 are modified to reflect only the data associated with the selected classes of drugs. Additionally, the classes that are filtered are distinguished by a difference in line weight than those not represented in the filtered data.

Figure 10:
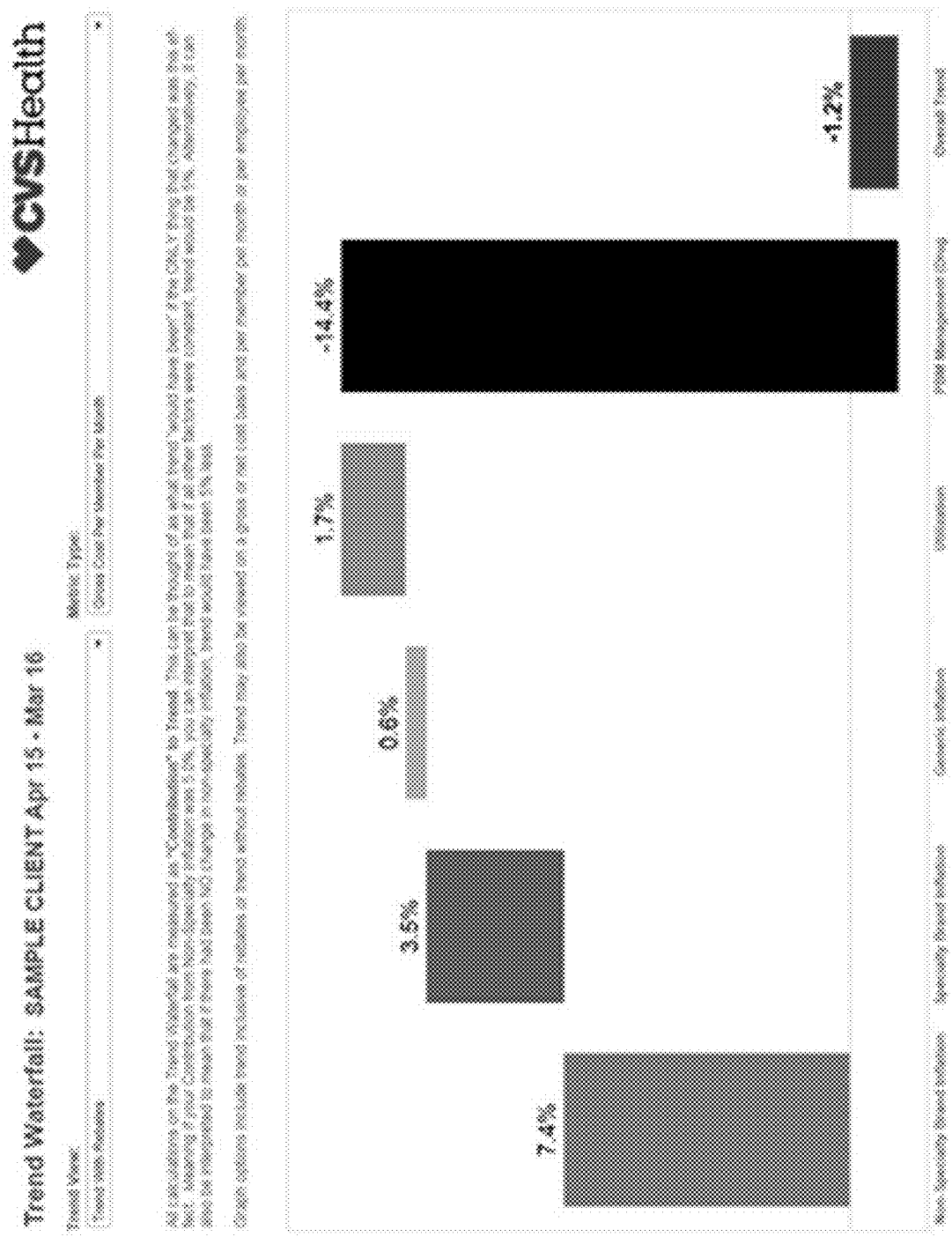
FIG. 10 is an example graphical user interface depicting a trend waterfall dashboard generated by the data analysis reporting tool.

FIG. 10 is an example graphical user interface depicting a trend waterfall generated by the data analysis reporting tool and included as a tab within the trend analysis dashboard. The trend waterfall demonstrates drivers of a client's trend broken into key categories, such as inflation, utilization, and prescription benefit manage (PBM) management. In some embodiments, these data points may utilize methods developed by Enterprise Analytics and align with data presented at the Book of Business level in publications, presentations, etc. The trend waterfall dashboard provides various views of this data, including with/without trend, by Gross Cost/Net Cost, and by Per Employee/Member per month (PEPM/PMPM).

Figure 11:
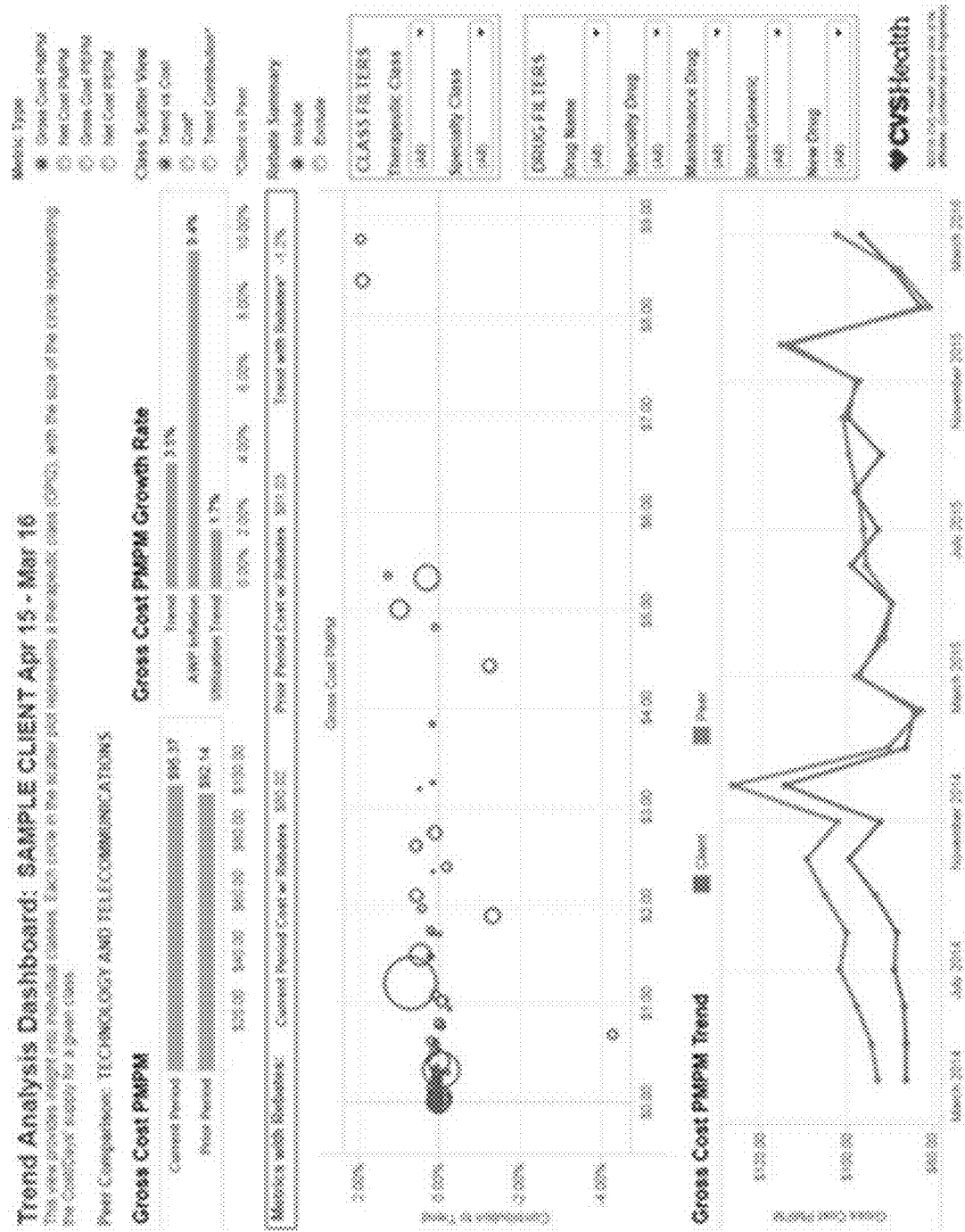
FIG. 11 is an example graphical user interface depicting a trend analysis dashboard generated by the data analysis reporting tool showing trend by class.

FIG. 11 is another example graphical user interface depicting a trend analysis dashboard generated by the data analysis reporting tool showing trend by class. In the example of FIG. 11, the dashboard helps to demonstrate the key therapeutic classes that are driving trend. Initially, the view is based on all claims for the reporting period as described above. In the top section of the dashboard, the costs are compared from the current to the prior reporting period and the client is able to see their overall trend along with key metrics such as average wholesale price (AWP) Inflation and Utilization Trend.

The scatterplot in the middle of the dashboard depicts circles, each representing a unique therapeutic class in which the client had utilization. In one embodiment, the size of the circle represents the cost per day of the drug (so the bigger the circle, the larger the cost per day supply). The y-axis of the scatterplot represents the contribution to trend and, as displayed, items higher on the graph have a more significant contribution to trend. The x-axis represents PEPM/PMPM so drugs further to the right represent a higher cost on a PEPM/PMPM basis.

In one embodiment, the default view of this scatter plot shows each drug plotted by cost and contribution to trend. This allows for each identification of those classes that were the most expensive (on a per member/employee per month basis) or drove the largest amount of trend. As the user clicks on a circle, all the data on the rest of the screen adjusts for that circle or selection of circles. Additionally, filters on the right of the dashboard allow for further segmentation of the data. In various embodiments, the data can be filtered by: drug class, specific drug or drugs, delivery system, maintenance medications, specialty, brand/generic.

Additionally, the trend analysis dashboard provides the gross cost PEPM/PMPM longitudinal graph which represents costs over a period (e.g., 24 months) so a user can easily identify trends or spikes, AWP and inflation trend, and peer benchmarks. In one embodiment, past trend projections may be displayed with actual past data to validate or display differences between projected data and actual data.

Figure 12:
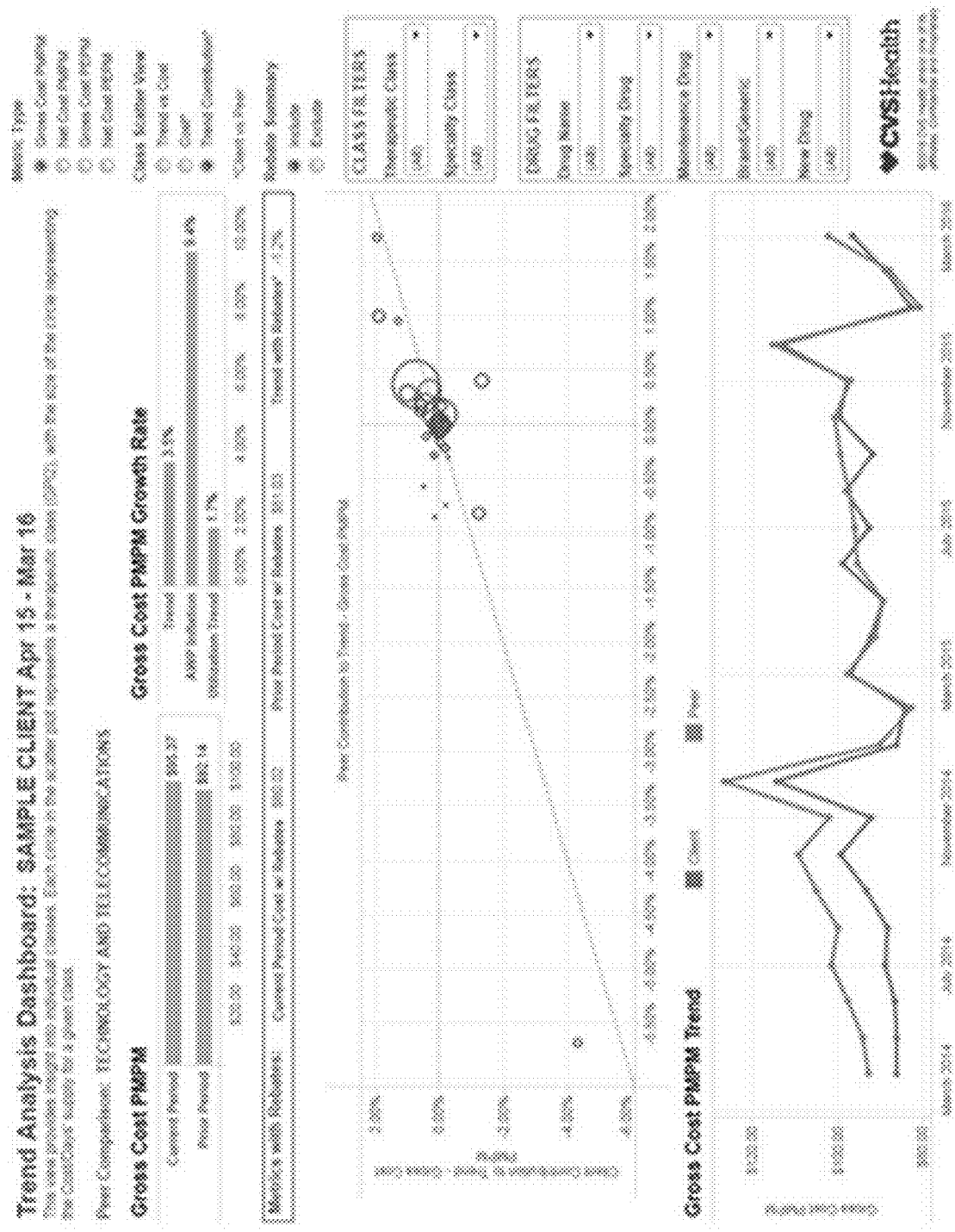
FIG. 12 is an example graphical user interface depicting a trend analysis dashboard generated by the data analysis reporting tool showing trend as a function of trend contribution.

FIG. 12 is an example graphical user interface depicting a trend analysis dashboard generated by the data analysis reporting tool showing trend as a function of trend contribution. In the example of FIG. 12, cost and client data are compared by benchmark data for contribution to trend. A forty-five-degree reference line separates client costs that were higher/lower than the benchmark. The technology introduced herein provides dynamic benchmark capability. When preparing the dashboard presentation file, the data analysis and reporting system 106 includes one or more customized benchmark datasets in the dashboard presentation file. In one embodiment, when client and cost data queries are performed by the database server, relevant benchmarks are auto-calculated and included in the dashboard presentation file. When the dashboard presentation file is loaded by the data analysis interface application 112 for presentation to a user, the benchmarks can be displayed on the same graphical user interface across the same complex grouping of drugs, time periods, product groupings, etc. as depicted in the example of FIG. 12. The benchmark data can be dynamically displayed based on selected drugs, time periods, product groupings, etc. without having to request additional data from the enterprise data warehouse, which offers advantages in compute time and also being able to present benchmark analysis in a tool that does not require a network connection to operate.

Figure 13:
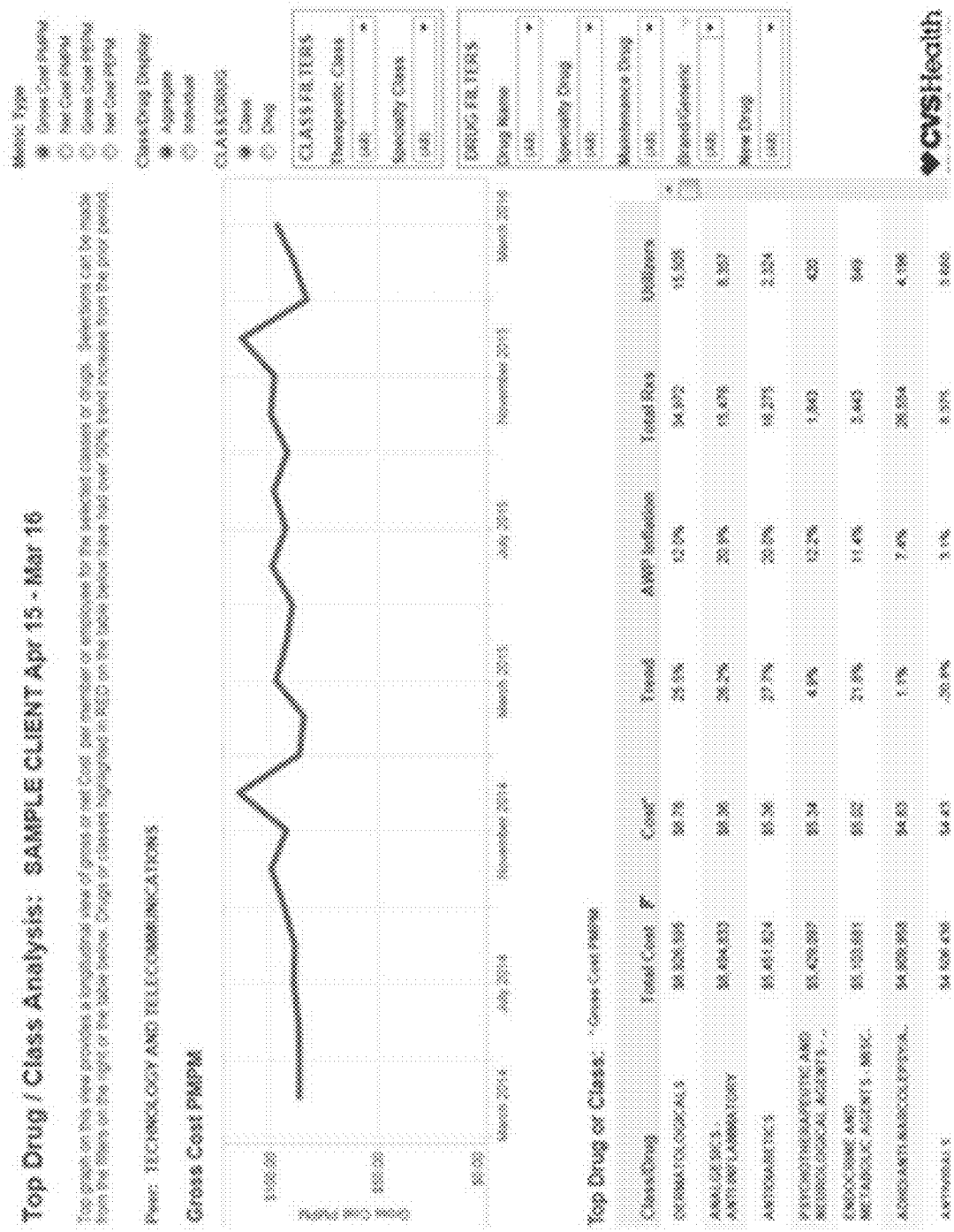
FIG. 13 is an example graphical user interface depicting a product analysis dashboard generated by the data analysis reporting tool.

FIG. 13 is an example graphical user interface depicting a product analysis dashboard generated by the data analysis reporting tool. The dashboard in the example of FIG. 13 provides top drug and class reporting. By using the grid, clients are able to easily sort data to identify drugs and classes that are the most expensive, most utilized, had the greatest trend, etc. In one embodiment, when a user clicks on a drug or selection of drugs in the grid, costs of the corresponding selection will be displayed longitudinally on the chart above.

Figure 14:
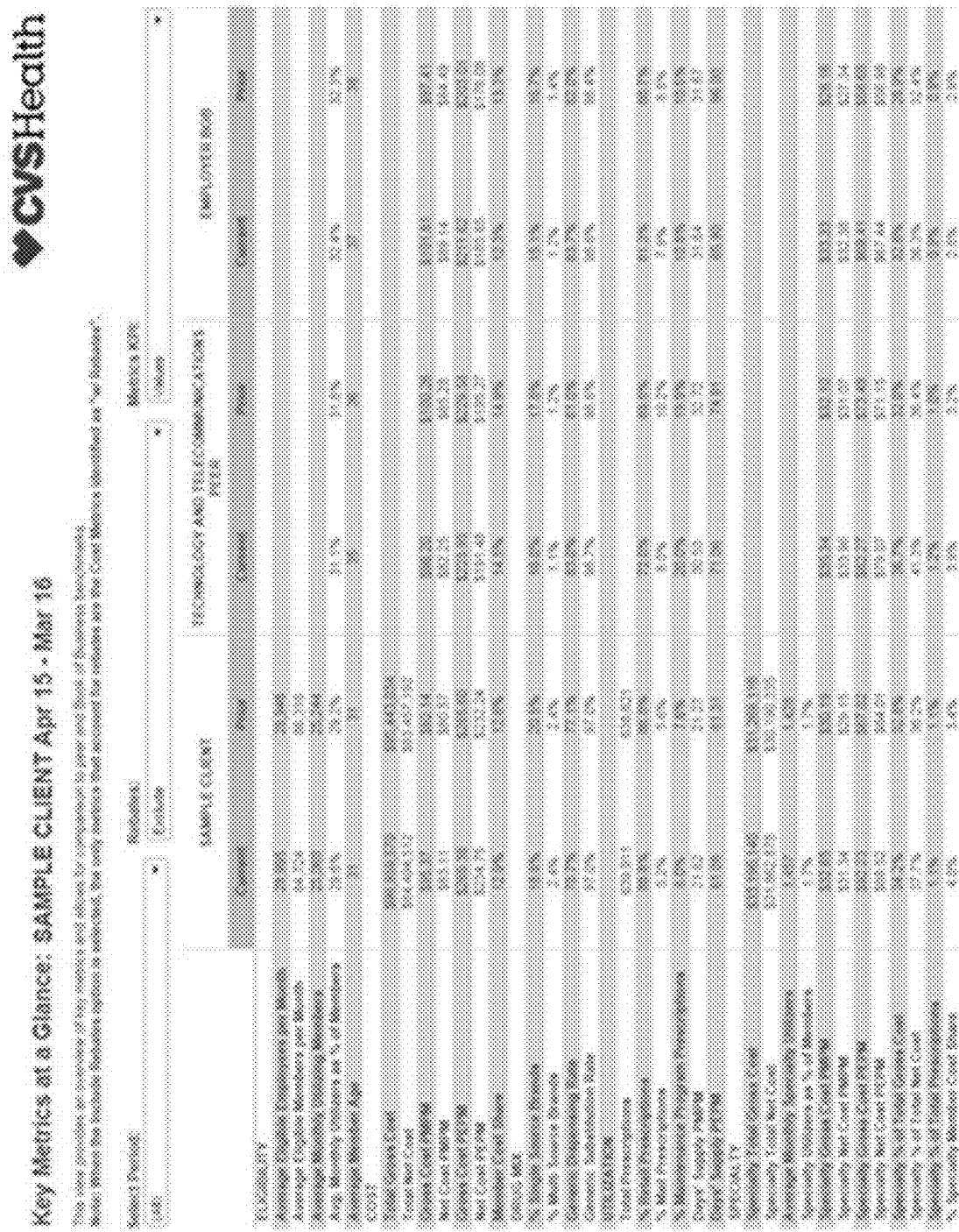
FIG. 14 is an example graphical user interface depicting a key metrics dashboard generated by the data analysis reporting tool.

FIG. 14 is an example graphical user interface depicting a key metrics dashboard generated by the data analysis reporting tool. The key metrics dashboard is designed to create a comprehensive view of key metrics that compare a client to benchmark data at the segment and peer level.

Figure 15:
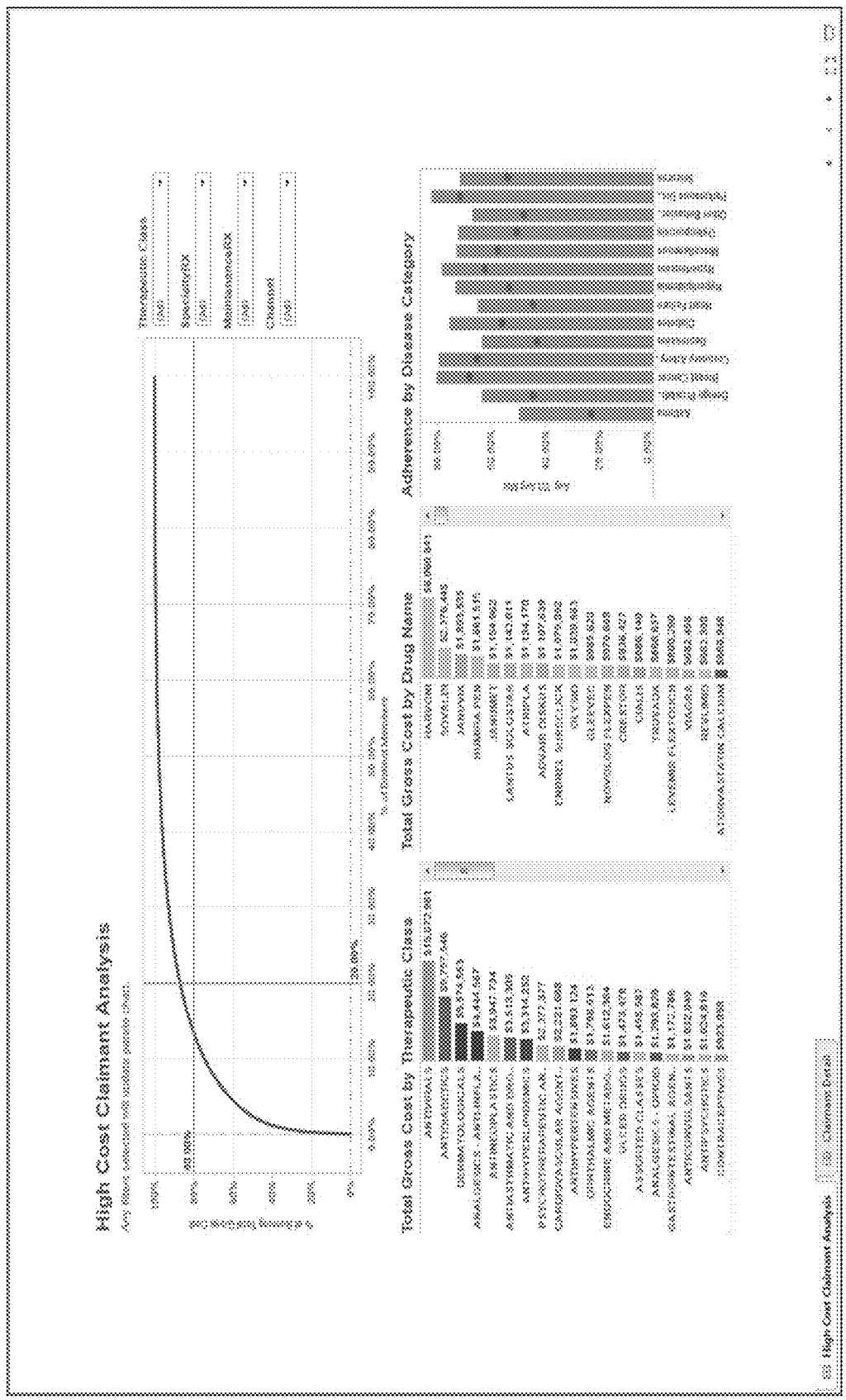
FIG. 15 is an example graphical user interface depicting a high cost claimant dashboard generated by the data analysis reporting tool.

FIG. 15 is an example graphical user interface depicting a high cost claimant dashboard generated by the data analysis reporting tool. The high cost claimant dashboard allows the client to focus in on members that are driving a significant portion of their cost. Further, the dashboard also allows the client to see the propensity of co-morbidities within particular chronic disease states. In the example of FIG. 15, the central portion of the dashboard is a Paredo chart, which provides a good visual of what percentage of members are driving the highest percentage of cost. Each dot on the chart represents the cumulative spend of each individual member ranked by gross cost. The bottom bar graphs in the high cost claimant dashboard represent the top classes and top drugs. The bottom right portion of the dashboard shows adherence data for top categories including the average medication possession ratio (MPR) and % Optimal.

The interactive dashboard allows a user to select a portion of the members (e.g., the top 5% costliest members) and the drugs and classes below shift to show which drugs are driving the cost for these members. Additionally, the adherence numbers on the right-hand portion of the dashboard also change so you can see if these costly members are adherent to their other medications. In addition to selecting a range, a user may select a single member or drug class and drill down into that specific data. In one embodiment, the dashboard provides a second tab that shows the individual members as well as various metrics including the number of conditions, PMPM, etc.

Figure 16:
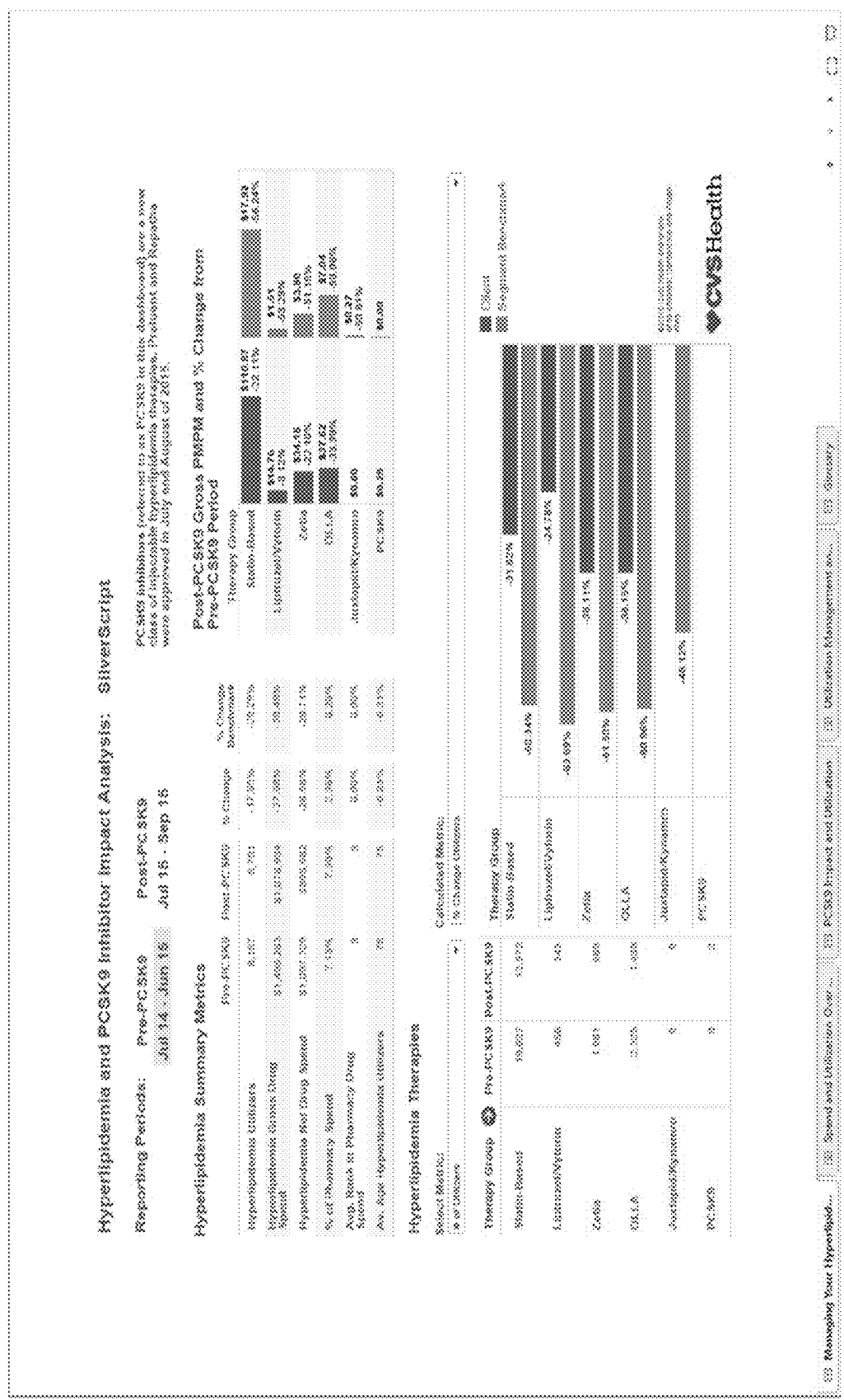
FIG. 16 is an example graphical user interface depicting a key metrics dashboard generated by the data analysis reporting tool.

FIG. 16 is an example graphical user interface depicting a class specific dashboard generated by the data analysis reporting tool. In the example of FIG. 16, the dashboard shows an overview of utilization of a particular drug (e.g., hyperlipidemic drugs) comparing two time periods, for example before and after a particular class of drugs was released (e.g., pre and post PCSK9 launch). The upper left chart in the dashboard provides overall class level metrics including spend, utilizers, etc. The chart on the right of the dashboard provides PMPM cost metrics broken down at the therapy level (e.g., statin, Zetia, etc.). In some embodiments, users can filter to see how the cost and utilization changes between the two time periods. The charts on the bottom of the dashboard provide additional cost and utilization metrics as well as percent changes in the selected metric when comparing the two time periods.

Figure 17:
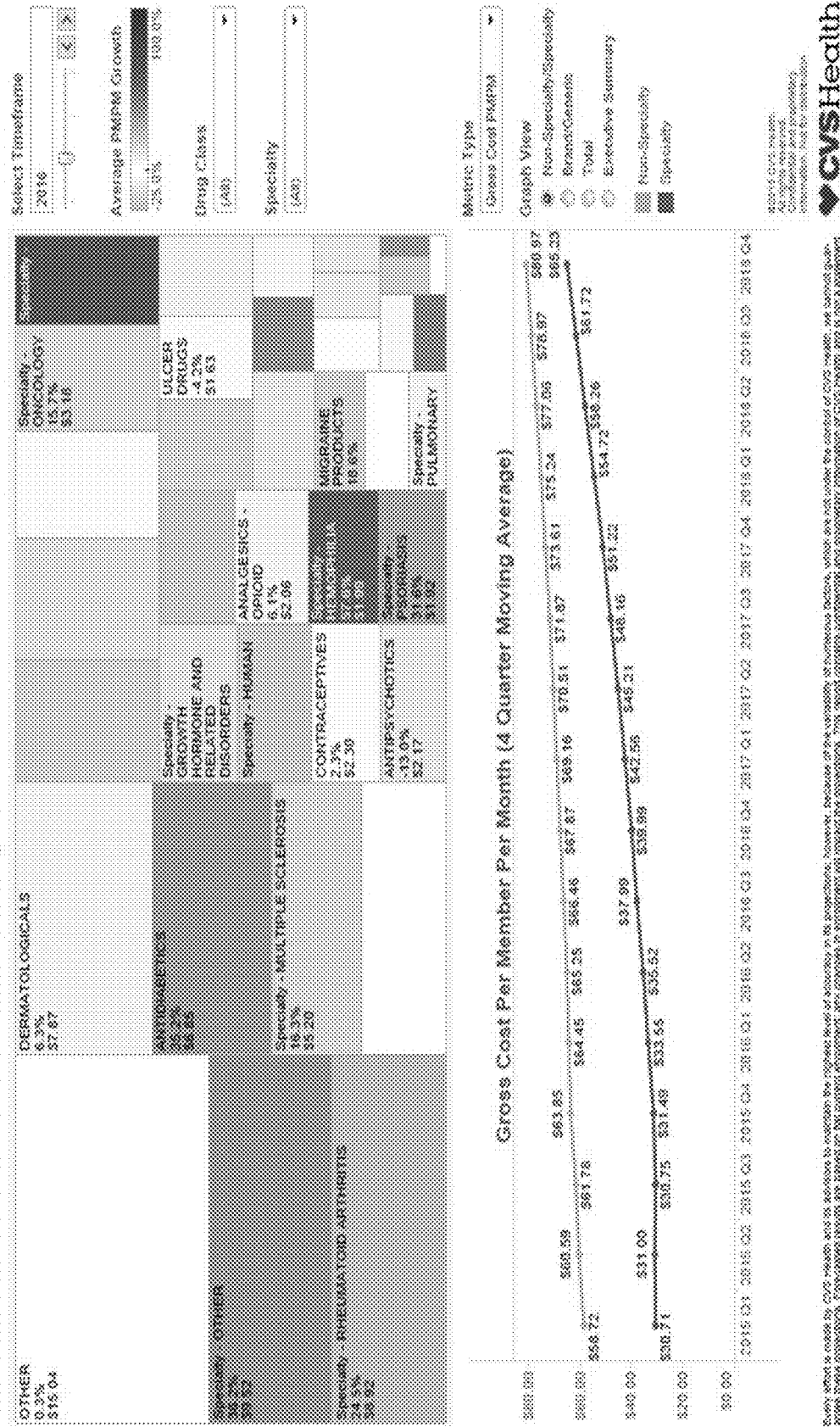
FIG. 17 is an example graphical user interface depicting a client trend forecast dashboard generated by the data analysis reporting tool.

FIG. 17 is an example graphical user interface depicting a client trend forecast dashboard generated by the data analysis reporting tool. The tree graph in the top portion of the dashboard shows the distribution of costs. The size of the box represents the cost, the larger the box, the bigger the gross cost PMPM. The color of the box represents the gross cost trend, the darker the color the greater the trend, the lighter the color the smaller the trend. The color or fill pattern of the box also represent negative or positive trend. In some embodiments, a user can click on one of the individual boxes and the line graph in the bottom portion of the dashboard will display the trend for that specific drug category.

The line graph in the bottom portion of the dashboard shows the progression of cost—both historical and estimated (gross cost PMPM or day supply). In various embodiments, other metrics that can be filtered on include: specialty/non-specialty, brand/generic, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
receiving, by a computing device, a request to generate reporting data for presentation in a dashboard;
generating, by the computing device, a data query based on the request, wherein
generating the data query comprises:
creating an entry in a request table;
building replace values based on a request type and associated data tasks;
validating the replace values, wherein the validating the replacement values comprises:
retrieving a validation task from a validation table;
executing the validation tasks; and
returning a pass or fail for the validation task;
retrieving data selects from the request table based on the request type; and
generating the data query by populating a shell query statement with the replace values;
executing, by the computing device, the data query on a database to create a report dataset, and a benchmark dataset based at least in part on the data query;
generating, by the computing device, a dashboard presentation file based on the report dataset, the benchmark dataset, and the request, the dashboard presentation file configured to accommodate dynamic display in the dashboard during a presentation without any additional requests to the database; and
transmitting, by the computing device, the dashboard presentation file to a user for the presentation.

2. The computer-implemented method of claim 1, wherein the replace values are derived from a local summary table.

3. The computer-implemented method of claim 1, wherein the replace values are derived from a data collected from the user via a user interface.

4. The computer-implemented method of claim 1, wherein the data query is one query in a group of queries.

5. The computer-implemented method of claim 1, further comprising:
rendering a graphical user interface including an analysis dashboard using the dashboard presentation file.

6. The computer-implemented method of claim 1, wherein the reporting data includes trend analysis data for prescription drug sales.

7. A system comprising:
one or more processors; and
a memory storing instructions, which when executed, cause the one or more processors to:
receive a request to generate reporting data for presentation in a dashboard;
generate a data query based on the request, wherein generating the data query comprises:
create an entry in a request table;
build replace values based on a request type and associated data tasks;
validate the replace values, wherein to validate the replacement values comprises:
retrieve a validation task from a validation table;
execute the validation tasks; and
return a pass or fail for the validation task;
retrieve data selects from the request table based on the request type; and
generate the data query by populating a shell query statement with the replace values;
execute the data query on a database to create a report dataset, and a benchmark dataset based at least in part on the data query;
generate a dashboard presentation file based on the report dataset, the benchmark dataset, and the request, the dashboard presentation file configured to accommodate dynamic display in the dashboard during a presentation without any additional requests to the database; and
transmit the dashboard presentation file to a user for the presentation.

8. The system of claim 7, wherein the replace values are derived from a local summary table.

9. The system of claim 7, wherein the replace values are derived from a data collected from the user via a user interface.

10. The system of claim 7, wherein the data query is one query in a group of queries.

11. The system of claim 7, wherein the reporting data includes trend analysis data for prescription drug sales.

* * * * *